US011866963B2

(12) United States Patent
La Porte

(10) Patent No.: US 11,866,963 B2
(45) Date of Patent: Jan. 9, 2024

(54) REMOTELY ACTUABLE RELEASE DEVICE FOR A VEHICLE DOOR LOCK

(71) Applicant: D. LA PORTE SÖHNE GMBH, Wuppertal (DE)

(72) Inventor: Bastian La Porte, Wuppertal (DE)

(73) Assignee: D. LA PORTE SÖHNE GMBH, Wuppertal (DE)

( * ) Notice: Subject to any disclaimer, the term of this patent is extended or adjusted under 35 U.S.C. 154(b) by 0 days.

(21) Appl. No.: 17/372,014

(22) Filed: Jul. 9, 2021

(65) Prior Publication Data

US 2022/0010602 A1 Jan. 13, 2022

(30) Foreign Application Priority Data

Jul. 9, 2020 (DE) .................... 20 2020 103 981.4

(51) Int. Cl.
*E05B 85/10* (2014.01)
*E05B 79/20* (2014.01)
*E05B 83/42* (2014.01)
*E05B 15/10* (2006.01)

(52) U.S. Cl.
CPC .............. *E05B 15/10* (2013.01); *E05B 79/20* (2013.01); *E05B 83/42* (2013.01)

(58) Field of Classification Search
CPC .......... E05B 85/10; E05B 85/12; E05B 85/14; E05B 85/16; E05B 79/20; E05B 79/26; E05B 7/00; E05B 79/22
See application file for complete search history.

(56) References Cited

U.S. PATENT DOCUMENTS 6,419,284 B1 * 7/2002 Kutschat ................ E05B 85/10 292/216
6,908,140 B1 * 6/2005 Carter .................... E05B 79/06 296/146.1
7,198,308 B2 * 4/2007 Lane ...................... E05B 85/10 292/DIG. 64
8,011,699 B2 9/2011 Lane
(Continued)

FOREIGN PATENT DOCUMENTS

DE 19952012 A1 5/2001
DE 202007005292 U1 6/2007
(Continued)

*Primary Examiner* — Alyson M Merlino
(74) *Attorney, Agent, or Firm* — DICKINSON WRIGHT PLLC

(57) ABSTRACT

The present invention relates to a remotely actuable release device (1) for unlocking of a vehicle door lock, in particular of a vehicle door lock of a construction machine or of an agricultural vehicle, including: a traverse tube (2), a remote actuation button (4) supported on the traverse tube (2) and actuated by pressing into the traverse tube (2), and a cable pull mechanism (6), which is in operative connection with the remote actuation button (4) and is disposed inside the traverse tube (2), for coupling to the vehicle door lock to be unlocked, wherein the release device (1) includes a cable holder (8), disposed inside the traverse tube (2), including at least two power cables (26) attached thereto, as well as a combined arrangement of a vehicle door lock for locking and latching of doors of motor vehicles with a release mechanism, wherein the release mechanism includes a remotely actuable release device.

45 Claims, 9 Drawing Sheets

(56) References Cited

U.S. PATENT DOCUMENTS

| | | | | |
|---|---|---|---|---|
| 8,827,327 | B2 | 9/2014 | Kutschat | |
| 9,221,319 | B2 | 12/2015 | Kato | |
| 9,273,498 | B2 * | 3/2016 | Kato | E05B 85/14 |
| 9,926,727 | B2 * | 3/2018 | Kouzuma | E05B 85/12 |
| 10,370,876 | B2 | 8/2019 | Farrenkothen | |
| 2004/0125545 | A1 * | 7/2004 | Kobayashi | E05B 81/76 361/600 |
| 2009/0091140 | A1 | 4/2009 | Lane | |
| 2010/0045052 | A1 | 2/2010 | Kutschat | |
| 2014/0239650 | A1 | 8/2014 | Kato | |

FOREIGN PATENT DOCUMENTS

| | | | |
|---|---|---|---|
| DE | 102008037956 | B4 | 4/2009 |
| DE | 102015000750 | A1 | 7/2016 |
| WO | 2017130606 | A1 | 8/2017 |

* cited by examiner

REMOTELY ACTUABLE RELEASE DEVICE FOR A VEHICLE DOOR LOCK

CROSS-REFERENCE TO RELATED APPLICATIONS

This application claims the benefit of priority under 35 U.S.C. § 119 to German Patent Application No. DE 20 2020 103 981.4, filed Jul. 9, 2020, the contents of which are incorporated herein by reference in their entirety.

FIELD OF THE INVENTION

The present invention relates to a remotely actuable release device for the unlocking of a lock of a vehicle-door or -hatch, in particular a door or hatch of an agricultural vehicle, e.g., of a tractor, or of a construction machine. The invention also relates to a combined arrangement or combination of such a remotely actuable release device with a vehicle door lock.

BACKGROUND SUMMARY

A generic lock usually includes a rotary latch assembly and is coupled to a release mechanism for the lock or for the rotary latch assembly. The release mechanism includes, for example, a first, remotely actuable and a second, locally actuable release device, wherein the remotely actuable release device includes a traverse tube, a remote actuation button, and a cable pull mechanism in operative connection with the remote actuation button. In the context of the invention, "remotely actuable" thus means that the actuation mechanism of the release device, namely the remote actuation button, is not directly attached to the lock case of the rotary latch assembly. In addition, a generic lock can also include two locally actuable or two remotely actuable release devices.

Such a vehicle door lock is known, for example, from DE 20 2007 005 292 U1 and DE 10 2015 000 750 A1. The rotary latch assembly of the vehicle door lock includes a lock case including a recess for a locking bolt in which at least one rotary latch is rotatably supported, wherein the rotary latch is drivable in connection with a rotary latch spring. In addition, at least one pivotable locking pawl is disposed in the lock case, using which locking pawl the rotary movement of the rotary latch is lockable, and thus the rotary latch assembly is lockable. The release mechanism includes a locally actuable release device and a remotely actuable release device, including a traverse tube, a remote actuation button, and a cable pull mechanism in operative connection with the remote actuation button. The locking pawl can be actuated both with the locally actuable release device and with the remotely actuable release device, so that the locking of the rotary latch(es) is releasable, wherein the release mechanism includes an actuation lever by means of which the locking pawl can be actuated and which can be actuated both using the locally actuable release device as well as using the remotely actuable release device.

These known locally and remotely actuable vehicle door locks have proven themselves.

Furthermore, generic door locks increasingly have electrical components or subassemblies that must be supplied with power via cables or lines. The cables additionally or alternatively also serve for transmission of electrical signals, in particular electrical pulses, e.g., between sensors and a control device.

An object of the present invention is therefore to provide a remotely actuable release device for a lock of the above-mentioned type that ensures a space-saving arrangement of the electrical cables.

A further object of the present invention is to provide such a lock in combination with such a remotely actuable release device.

These objects are achieved by a remotely actuable release device having the features as described herein as well as a combination or a combined arrangement having such features. Advantageous further developments of the invention are characterized in the subsequent dependent claims.

In the following, the invention is described in more detail by way of example with reference to a drawing.

BRIEF DESCRIPTION OF THE DRAWINGS

It is shown.

DETAILED DESCRIPTION

Figure 1:
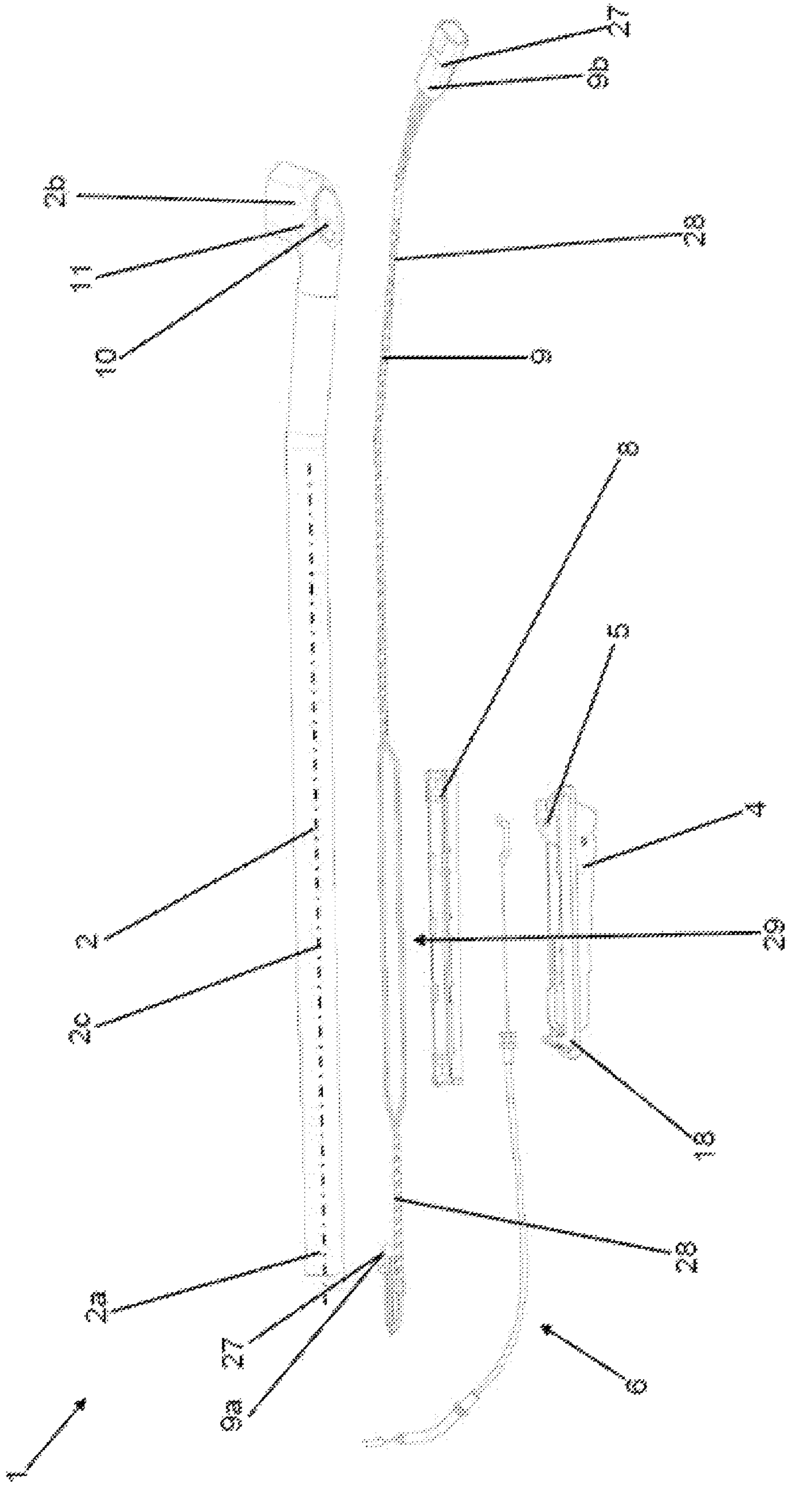
FIG. 1: A perspective exploded view of the remotely actuable release device according to the invention.
Figure 2:
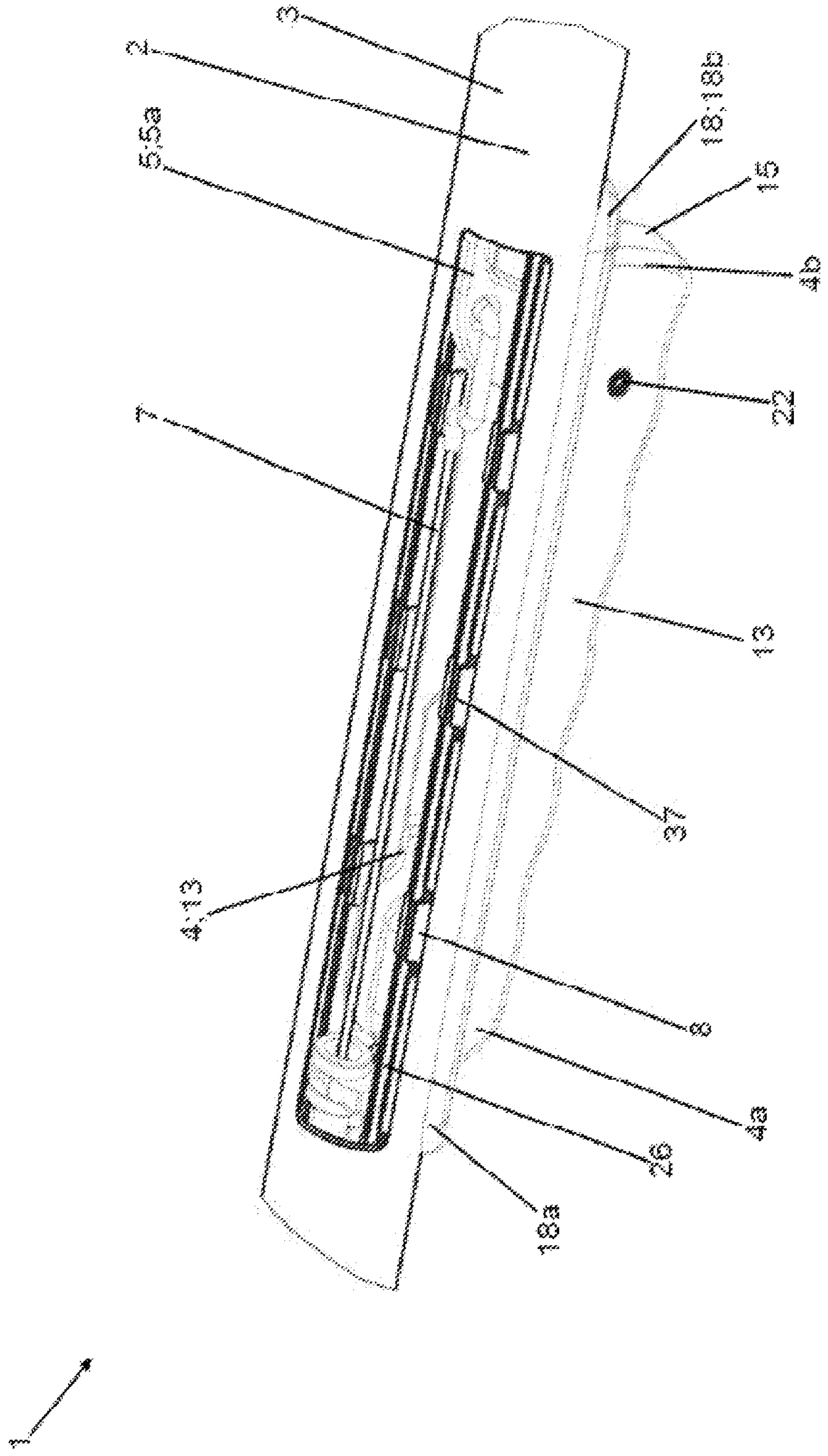
FIG. 2: A perspective view of a part of the remotely actuable release device according to the invention in the assembled state (the depicted opening in the traverse tube only serves for illustration of the components arranged in the interior of the traverse tube, i.e., a part of the tube wall is cut away for illustration).

The remotely actuable release device 1 according to the invention (FIGS. 1, 2, 4, 5) includes a traverse tube 2, a remote actuation button 4 supported on the traverse tube 2 and protruding over a tube wall 3 of the traverse tube 2 and being pressable into the traverse tube 2, a coupling lever 5 arranged inside the traverse tube 2, which is in operative connection with the remote actuation button 4, and a cable pull mechanism 6 with a pull cable 7 or a pull rod (not depicted). Here, the cable pull mechanism 6 is in operative connection both with a lock to be unlocked (not shown), in particular a rotary-latch lock, and with the coupling lever 5.

According to the invention, the inventive remotely actuable release device 1 also includes a cable holder 8 for retaining power cables 26 of a cable- or line-bundle 9.

The traverse tube 2 is configured in a known manner and includes the tube wall 3 as well as a first tube end 2*a* facing the lock or on the lock-side, and a second tube end 2*b* opposite thereto facing away from the lock. On its second tube end 2*b*, the traverse tube 2 is attached in a known manner to the vehicle door to be opened. In addition, preferably on its second tube end 2*b*, the traverse tube 2 includes an opening 10 passing through the tube wall 3. Furthermore, the traverse tube 2 optionally includes a bend 11 on its second tube end 2*b*, which serves, if necessary, for mounting the traverse tube 2 on a window of the vehicle.

In addition, the traverse tube 2 includes a longitudinal slot 12 extending through the tube wall 3, which is penetrated through by the remote actuation button 4.

The traverse tube 2 also preferably has an outer diameter of 20 to 40 mm, preferably 25 to 30 mm.

The longitudinally formed, hollow remote actuation button 4 includes a first, lock-side button end 4*a* and a second button end 4*b* opposite thereto. In addition, the remote actuation button 4 includes preferably two button side walls 13 spaced from each other, as well as a button top wall 14 and preferably two button end walls 15. Opposite the button top wall 14, the remote actuation button 4 is open. A hollow button interior 16 is thus formed between the two button side walls 13, the button top wall 14 and the two button end walls 15. Webs 17 formed on the button side walls 13 serve for stabilization.

Preferably the button top wall 14 is also ergonomically shaped, in particular wave-shaped, in order to make it easier for the operator to press the remote actuation button 4. However, the button top wall 14 can also be formed, for example, straight or planar.

The remote actuation button 4 is also preferably composed of plastic.

The remotely actuable release device 1 according to the invention preferably also includes a cuboid supporting frame 18 for supporting the remote actuation button 4.

The elongated and cuboid supporting frame 18 includes an attachment lug 19 on its second frame end 18*b* facing away from the lock. In addition, on the opposing first, lock-side frame end 18*a*, a movable and spring-loaded latching element 20 including a latching lug 21 is inserted into the supporting frame 18. The latching lug 21 serves for clipping the bearing frame 18 into the longitudinal slot 12 of the traverse tube 2. Apart from that, the supporting frame 18 is arranged in a form-fit manner in the longitudinal slot 12. This is known per se.

In addition, the supporting frame 18 includes a circumferential frame edge 39 and two frame side walls 40 spaced from each other. The two frame side walls 40 have a longitudinal extension parallel to the tube longitudinal axis 2*c* and are spaced from each other perpendicular thereto.

On the lock-side button end 4*a*, the button side walls 13 include outer-side supporting grooves having a spiral course. For this purpose the supporting frame 18 includes corresponding raised contours that are guided in the supporting grooves. The raised contours are present in particular on the outside in the two frame side walls 40. In this way, the remote actuation button 4 is rotatably supported in the supporting frame 18, likewise in a known manner, about an axis of rotation perpendicular to the tube longitudinal axis 2*c*.

The coupling lever 5 includes a first lever end 5*a* and a second lever end 5*b*. On its second lever end 5*b*, the coupling lever 5 is rotatably connected to the remote actuation button 4. For this purpose, the coupling lever 5 is disposed with its second lever end 5*b* in the button interior 16 between the two button side walls 13. In addition, the coupling lever 5 is disposed on the second button end 4*b*. For supporting the coupling lever 5, a supporting bolt 22 is preferably present that extends through a bearing recess in the coupling lever 5 and respectively through a supporting recess in the two button side walls 13.

On its first lever end 5*a*, the coupling lever 5 includes a rolling surface 23 and a base surface 24. In addition, on its first lever end 5*a*, the coupling lever 5 includes a recess for coupling to the cable pull mechanism 6.

Figure 4:
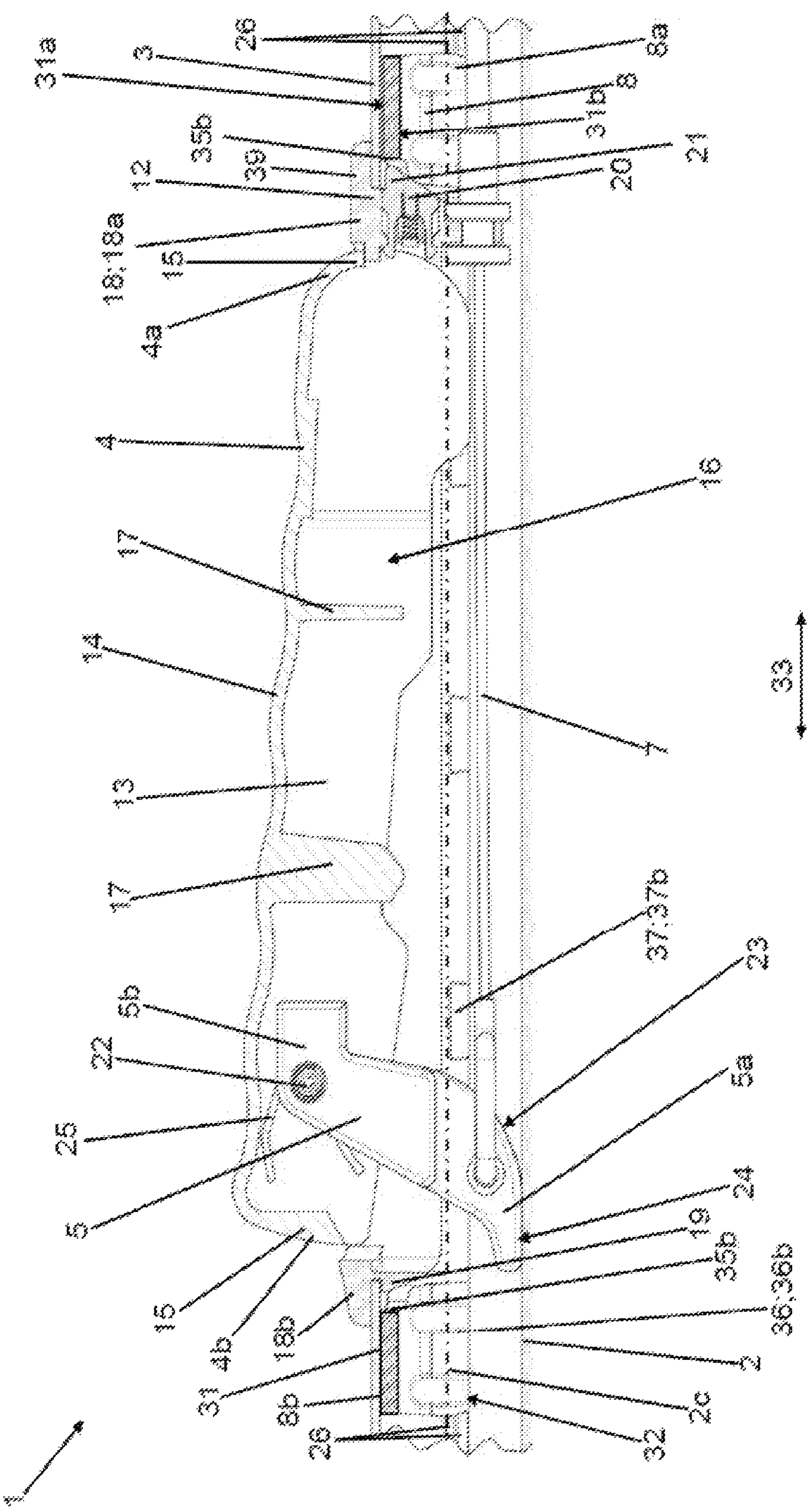
FIG. 4: A longitudinal section through a part of the remotely actuable release device according to the invention with unactuated, non-pressed remote actuation button.

Furthermore, a spring 25 is present between the coupling lever 5 and the remote actuation button 4, which spring 25 drives both into their non-actuated, non-pressed position (FIG. 4).

The cable pull mechanism 6 is configured in a known manner and includes the pull cable 7. The pull cable 7 is connected on one end at the first lever end 5*a* to the coupling lever 5, and on the other end to the lock mechanism of the lock to be opened. Instead of the pull cable 7, the cable pull mechanism, as already explained above, can also include another pull element, e.g., a pull rod.

Preferably, the lock is configured according to DE 10 2015 000 750 A1, to which reference is hereby made to the full content.

As already explained, the supporting frame 18 is inserted in the longitudinal slot 12 of the traverse tube 2, in particular clipped-in. It then borders the longitudinal slot 12.

In addition, the remote actuation button 4 is also inserted in a known manner into the supporting frame 18 and the longitudinal slot 12. In its non-actuated or non-pressed position (FIG. 4), the remote actuation button 4 is only partially arranged inside the traverse tube 2 and protrudes with the button top wall 14 and a part of the button side walls 13 out of the traverse tube 2 or protrudes above it. The coupling lever 5 abuts with its base surface 24 on the inner side against the tube wall 3.

Figure 5:
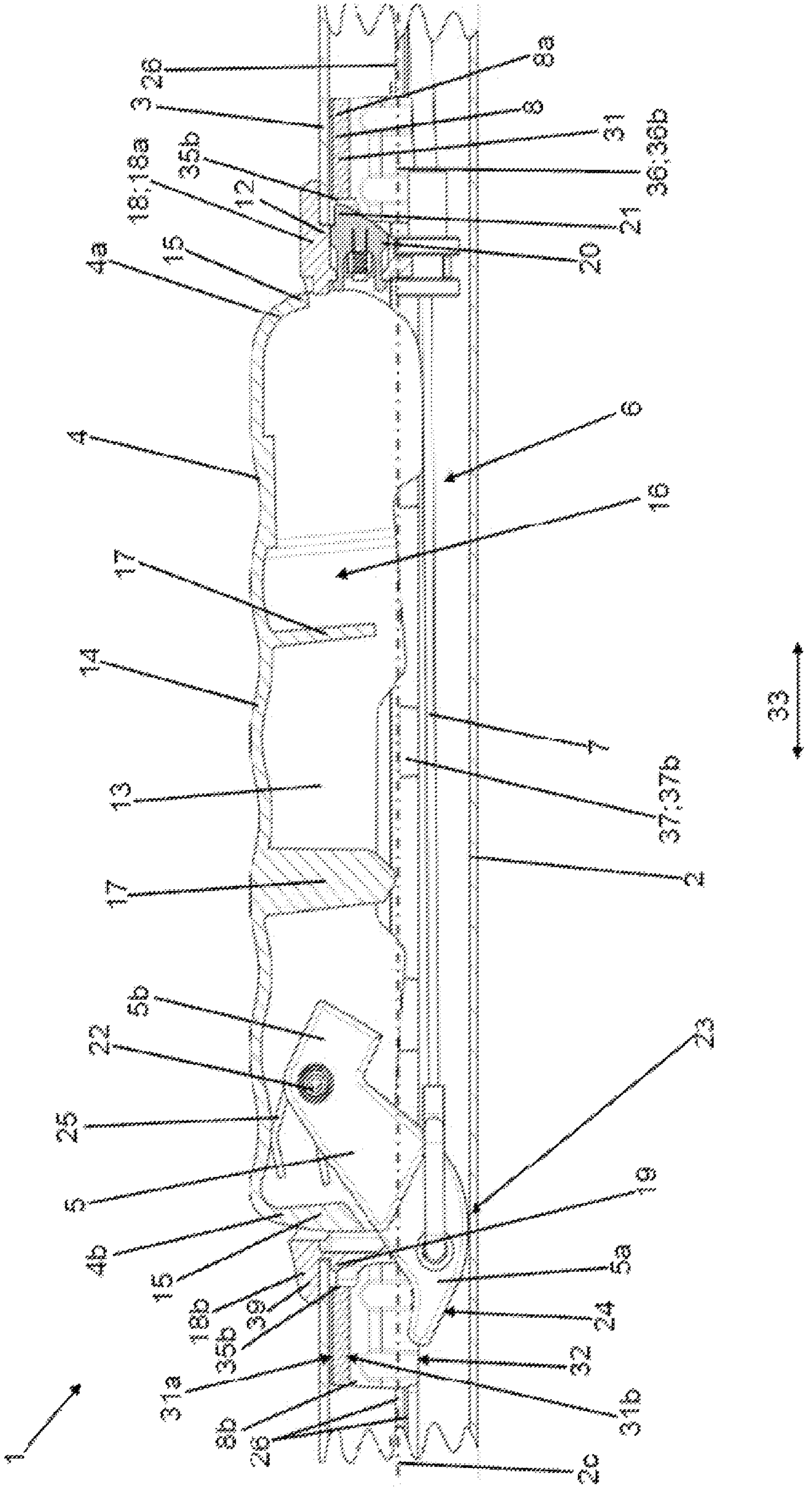
FIG. 5: A longitudinal section through a part of the remotely actuable release device according to the invention with actuated, pressed remote actuation button.
Figure 6:
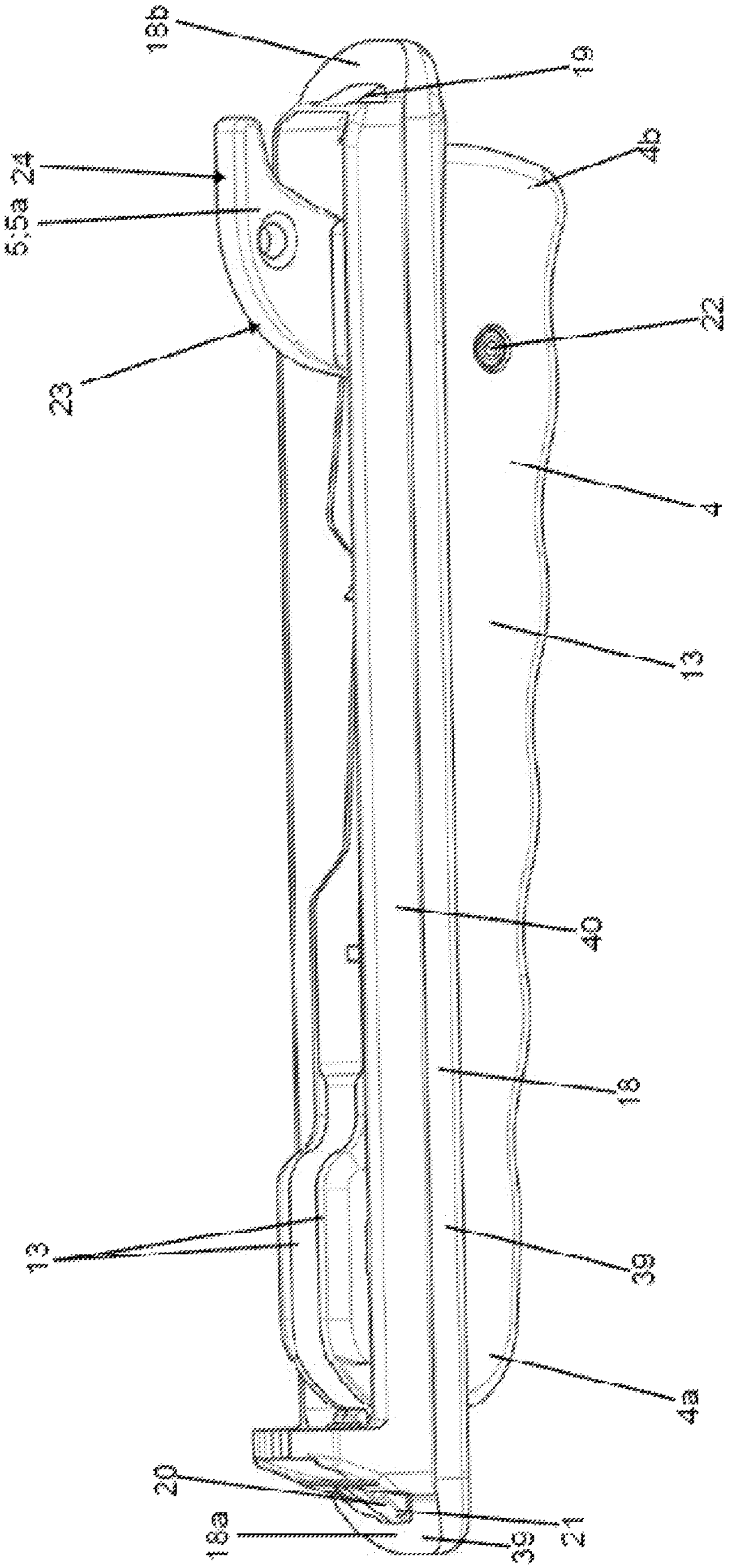
FIG. 6: A perspective view of the remote actuation button, a support frame, and a coupling lever.

To open the lock, the remote actuation button 4 is now pressed in a known manner by the operator on its button actuation end 2*b* into the traverse tube 2 (FIG. 5). In doing so, the coupling lever 5 pivots about the supporting bolt 22 and rolls with the rolling surface 23 on the inside of the tube wall 3. Due to the rotational movement of the coupling lever 5, the pull cable 7 is moved away from the lock and thereby the lock mechanism is actuated, so that the lock is unlocked.

As soon as the operator releases the remote actuation button 4, it automatically returns to its non-actuated or non-pressed initial position. For this purpose, a spring 25 is preferably present. The spring 25 is disposed between the coupling lever 5 and the remote actuation button 4, and is preferably disposed on the supporting bolt 22. The spring 25 presses and thus also holds the remote actuation button 4 in its non-actuated initial position.

This described functionality of the remotely actuable release device 1 is known per se.

As already explained, the remotely actuable release device 1 according to the invention now also includes, according to the invention, the cable holder 8 for retaining the cables 26 of the cable- or line-bundle 9.

The cable bundle 9 preferably serves for supplying power to one or more electrical components or subassemblies of the lock and/or a locally actuable release device arranged directly adjacent to the lock. The locally actuable release device can be in a known manner, for example, a pull handle or a pushbutton handle or a shell type handle. The locally actuable release device also serves for unlocking the lock like the remotely actuable release device 1. For example, the cable bundle 9 can serve for supplying power to a pulling device of the lock and/or to an illumination of the locally actuable release device.

Additionally or alternatively thereto, the cable bundle 9 serves for transmission of electrical signals, in particular electrical pulses, e.g., between sensors and a control device. It can thus serve for data transmission.

The cable bundle 9 includes at least two power cables 26. In addition, it includes a first, lock-side bundle end 9*a* and a second bundle end 9*b*.

In addition, the cable bundle 9 includes an electrical terminal element 27 at each end. The cable bundle 9 also preferably includes two bundled sections 28 and a split section 29 disposed therebetween. In the bundled sections 28, all cables 26 are bundled with one another and form a single cable harness. Preferably, the individual cables 26 are sheathed for this purpose.

In the split section 29, the cable bundle 9 is divided or split into two cable harnesses 30*a;b*, each of which consists of at least one cable 26, preferably of a plurality of cables 26. In the region of the split section 29, the cable bundle 9 is also attached to or retained within the cable holder 8 according to the invention.

The cable holder 8 according to the invention is preferably configured as a channel and includes a channel wall 31 including a channel wall outer surface 31*a* and a channel wall inner surface 31*b*. In addition, the channel wall 31 includes two wall longitudinal edges 32. The cable holder 8 also has a channel longitudinal direction 33. In addition, it includes a first, lock-side holder end 8*a* and a second holder end 8*b*. The cable holder 8 is open at the two holder ends 8*a;b*.

The cable holder 8 is preferably also composed of plastic.

Furthermore, the cable holder 8 preferably has a round cross-section. In particular, the diameter of the channel wall outer surface 31*a* corresponds to the inner diameter of the tube wall 3 of the traverse tube 2.

The cable holder 8 also preferably includes two cable receiving grooves or cable receiving channels 34. The cable receiving grooves 34 each extend from one of the two wall longitudinal edges 32 into the channel wall 31. They also divide the respective wall longitudinal edges 32 into an outer edge section 32*a* and an inner edge section 32*b*. The cable receiving grooves 34 also extend parallel to the channel longitudinal direction 33 and over the entire longitudinal extension of the cable holder 8 or over the entire wall longitudinal edge 32. The cable receiving grooves 34 are also open at the two holder ends 8*a;b*.

Furthermore, the cable holder 8 preferably includes a penetration slot 35 extending parallel to the channel longitudinal direction 33. The penetration slot 35 is penetrated by the remote actuation button 4, which is discussed below in more detail. It extends through the channel wall 31. Viewed in the circumferential direction of the cable holder 8, the penetration slot 35 is disposed centrally. It also extends between the two holder ends 8*a;b*. The penetration slot 35 also includes two slot longitudinal edges 35*a* and two slot end edges 35*b*. Preferably, the penetration slot 35 has an essentially cuboid contour.

The channel-like cable holder 8 preferably also has an extension in the circumferential direction of slightly more than 180°. This serves for a more stable retaining of the cable holder 8 inside the traverse tube 2.

Furthermore, the cable holder 8 includes a plurality of clips 36;37 for retaining the cables 26, in particular in a clamping and/or form-fitting manner.

The clips 36;37 each include two clip halves 36*a;b*; 37*a;b*, between which one of the cables 26 is held, in particular in a clamping and/or form-fitting manner. In particular, the clips 36;37 each include an outer clip half 36*a*;37*a* and an inner clip half 36*b*;37*b*.

The cable holder 8 preferably includes four first clips 36 and a plurality of second clips 37. The first clips 36 are each disposed on one of the two holder ends 8*a;b*. Viewed in the channel longitudinal direction 33, the second clips 37 are disposed therebetween.

The outer clip halves 36*a*;37*a* are also each connected to the outer edge section 32*a* of the wall longitudinal edge 32 and protrude therefrom. In particular, the outer clip halves 36*a*;37*a* are resiliently connected to the outer edge section 32*a*. They also preferably protrude over the outer edge section 32*a*.

Figure 3:
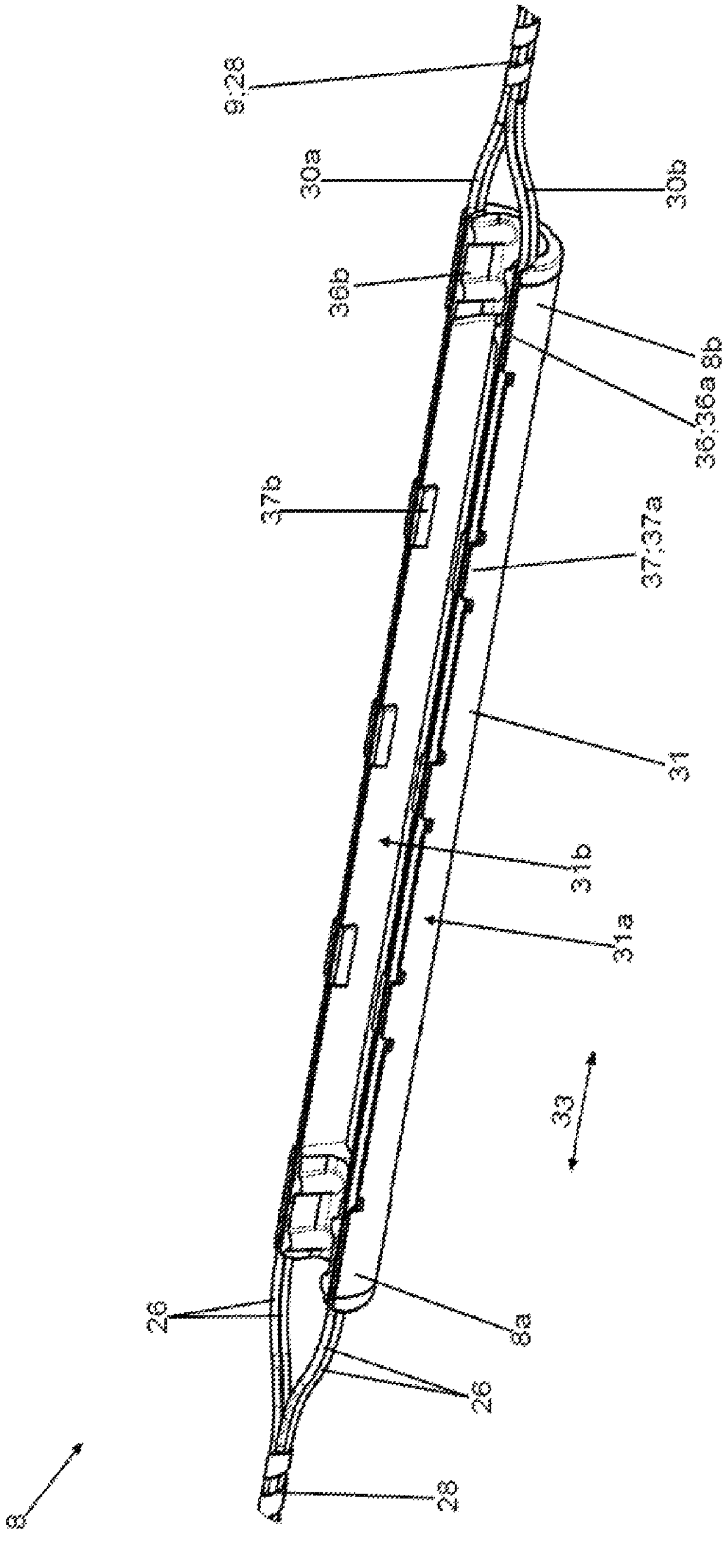
FIG. 3: A perspective view of a cable holder of the remotely actuable release device according to the invention.
Figure 7:
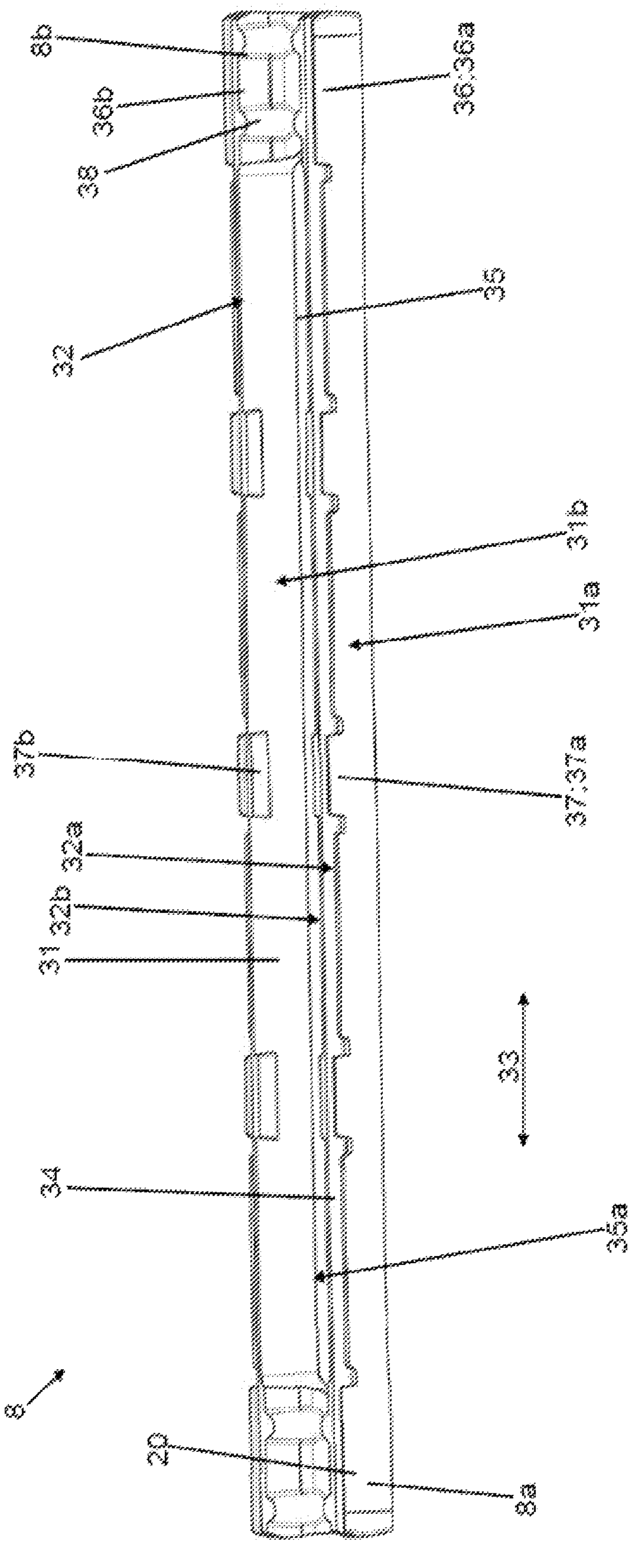
FIG. 7: A further perspective view of the cable holder.

The inner clip halves 36*b*;37*b* are preferably connected to the channel wall inner surface 31*b* and protrude inward therefrom. According to a first embodiment of the invention (FIGS. 2, 3, 7), they also do not protrude over the inner edge section 32*b*, but rather lie at the same height or are flush therewith.

Viewed in the channel longitudinal direction 33, the first clips 36 are also preferably formed longer than the second clips 37. This serves for strengthened retention of the cables 26 in these regions.

Furthermore, the inner clip halves 36*b* of the first clip 36 preferably include a plurality of, preferably two, ribs 38. The ribs 38 preferably extend in the circumferential direction of the channel wall 31 and are present in particular due to the manufacturing process.

Figure 9:
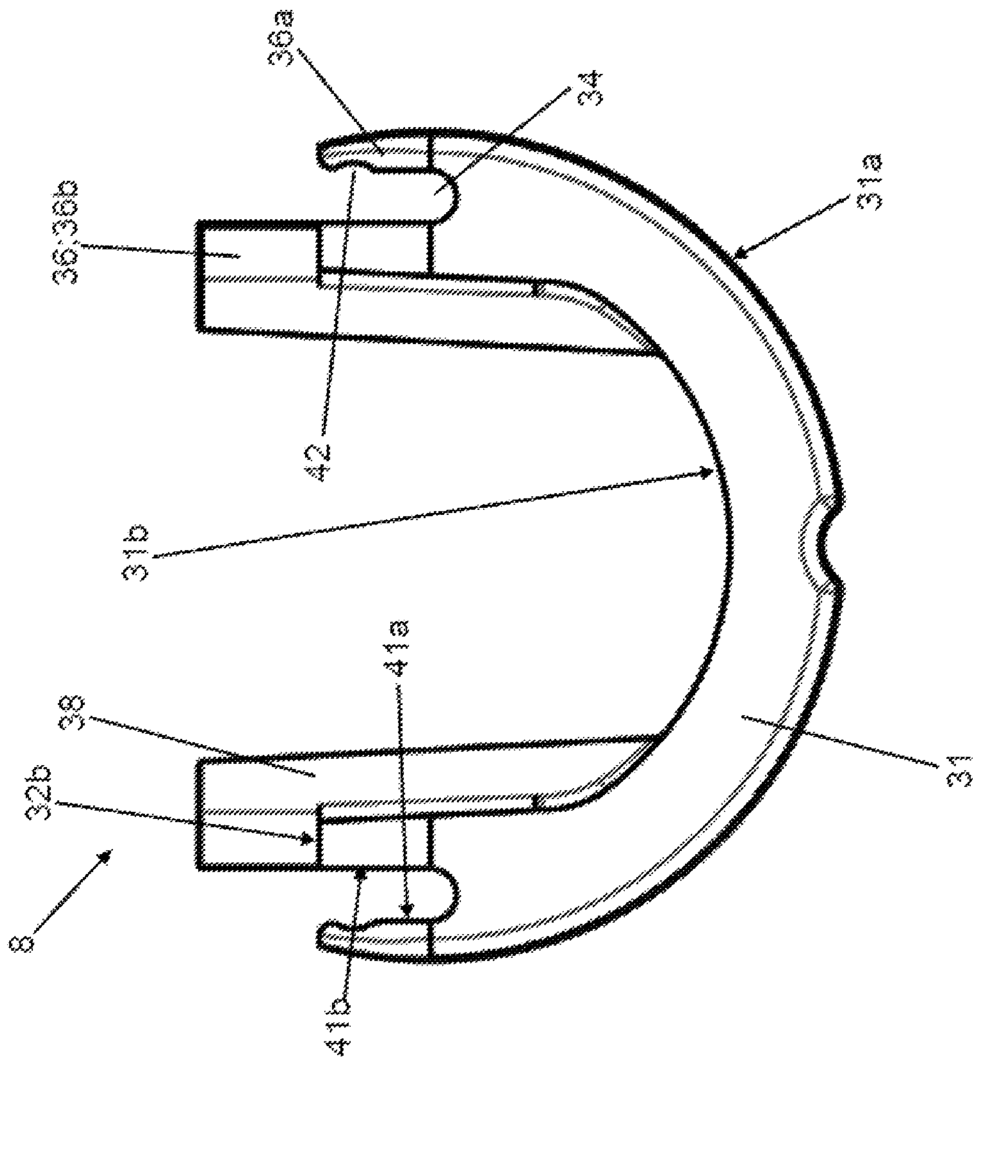
FIG. 9: A cross-section through the cable holder according to FIG. 8.

Furthermore, the two clip halves 36*a;b*; 37*a;b* each include a clamping surface or clip surface 41*a;b* (FIG. 9) facing toward the other clip half 36*a;b*; 37*a;b*, which serve for clamping and/or form-fit retaining of at least one cable 26. For this purpose, preferably at least one of the two clip surfaces 41*a;b* includes a channel-like recess 42 extending parallel to the channel longitudinal direction 33. The recess 42 serves for retaining at least one cable 26 in a form-fitting and/or clamping manner, which is discussed in more detail below.

Figure 8:
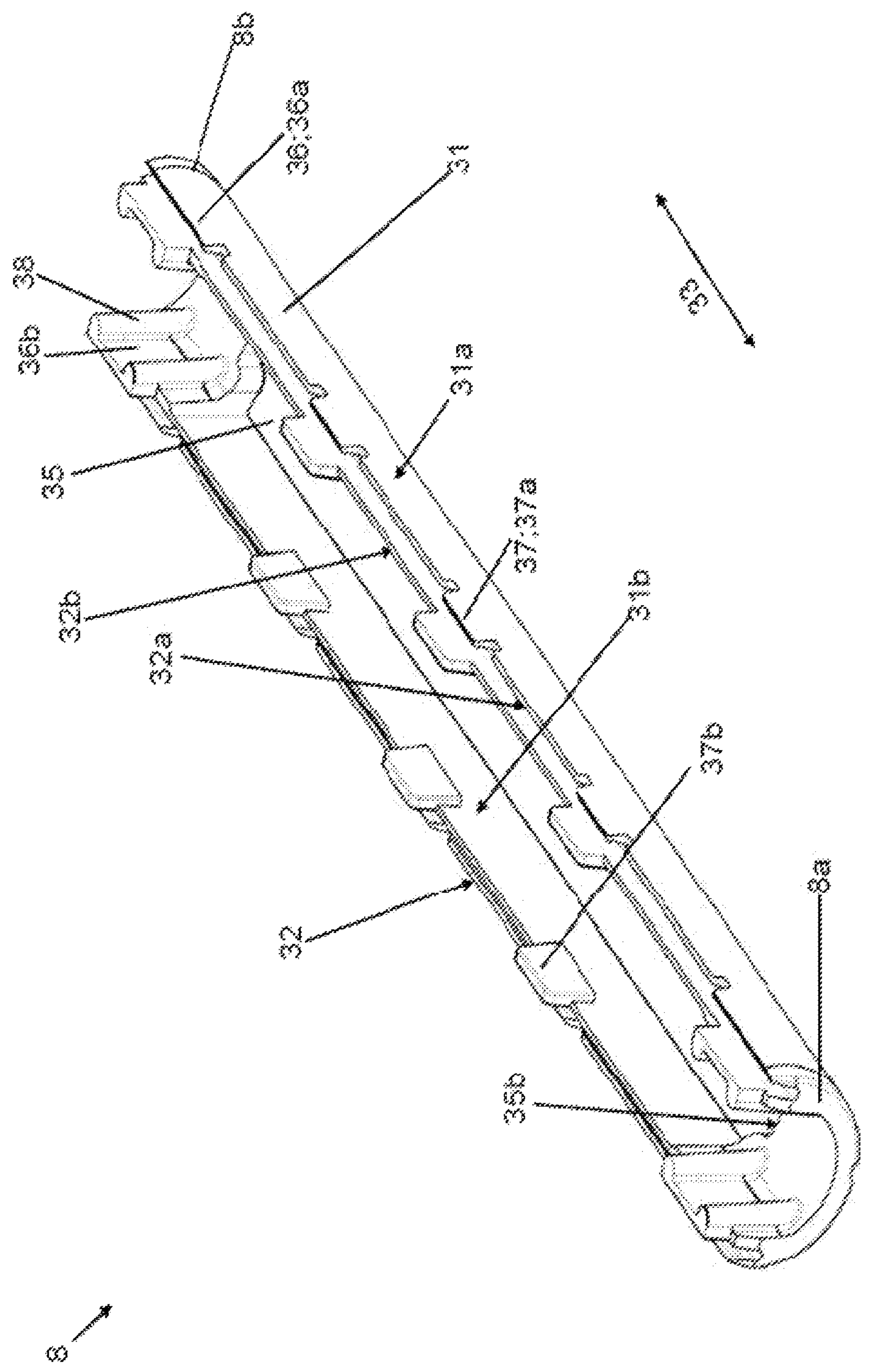
FIG. 8: A perspective view of the cable holder according to a further embodiment.

According to a further, preferred embodiment of the invention (FIGS. 8 and 9), the inner clip halves 36*b*; 37*b* protrude over the inner edge section 32*b*. In particular, the inner clip halves 36*b*; 37*b* protrude past the outer clip halves 36*a*; 37*a*. In particular, the inner clip halves 36*b*; 37*b* protrude so far that in the later installed state they abut against the tube wall of the traverse tube 2 on the inside or are slightly spaced therefrom.

Furthermore, viewed in the circumferential direction, the inner edge section 32*b* preferably protrudes over the outer edge section 32*a*.

For retaining or fixing the cables 26, the two cables 26 of a split section 29 are now disposed one above the other. The lower cable 26 is respectively disposed in the cable receiving groove 34, and the upper cable 26 is disposed in particular outside the cable receiving groove 34 and is retained by the clips 36; 37. In particular, it is respectively disposed between the two clip halves 36*a;b*; 37*a;b* of the clip 36;37 and is fixed by these, in particular in a clamping and/or form-fitting manner. For this purpose, the upper cable 26 is preferably disposed in a form-fitting manner within the recess 42.

Here the lower cable 26 is preferably thinner than the upper cable 26. However, since the upper cable 26 is fixed in the clips 36;37, the thinner lower cable 26 can also not escape from the cable receiving groove 34.

The cables 26 are thus releasably fixed in the cable holder 8.

As already explained, the cable holder 8 serves for retaining and fixing the cables 26 inside the traverse tube 2. For this purpose, the cable holder 8 with the cables 26 mounted thereon is inserted into the traverse tube 2, in particular from the lock-side tube end 2*a*. The cable holder

8 is pushed in until the penetration slot 35 of the cable holder 8 is arranged flush and directly adjoining or adjacent to the longitudinal slot 12 of the traverse tube 2. The wall longitudinal edges 32 of the channel wall 31 of the cable holder 8 thus point away from the longitudinal slot 12 of the traverse tube 2.

Since the diameter of the channel wall outer surface 31*a* also corresponds to the inner diameter of the tube wall 3, the channel wall outer surface 31*a* abuts against the inside of the tube wall 3 in a form-fitting manner.

Due to the form-fitting arrangement, the cable holder 8 is only rotatable relative to the traverse tube 2 about a tube longitudinal axis 2*c* of the traverse tube 2, and is displaceable parallel to the tube longitudinal axis 2*c* with respect to the traverse tube 2, and otherwise non-rotatable and immovable relative to the transverse tube 2.

In addition, in the second embodiment (FIGS. 8, 9), the inner clip halves 36*b*;37*b* abut on the inside of the tube wall 3 of the traverse tube 2 or are slightly spaced therefrom. As a result, the cables 26 are enclosed in the space formed by the clip halves 36*a;b* or 37*a;b*, the cable receiving groove, and the tube wall 3 and can no longer escape therefrom, even if the upper cable 26 should disengage from the recess 42.

Subsequently, the remote actuation button 4 and the supporting frame 18 are then mounted. For this purpose, the remote actuation button 4 and the coupling lever 5 are preferably already preassembled.

The supporting frame 18 is inserted in a known manner into the longitudinal slot 12 of the traverse tube 2 and latched with the traverse tube 2. In addition, the frame side walls 40 abut against the longitudinal slot 12. This is known per se. The supporting frame 18 is thus fixed in a form-fitting manner in the traverse tube 2.

In addition, the supporting frame 18 also penetrates with the attachment lug 19 and the latching element 20 through the penetration slot 35 of the cable holder 8, but without these two elements being in contact with the cable holder 8.

However, the supporting frame 18, in particular with the frame side walls, abuts in a form-fitting manner against the slot end edges 35*b* and the slot longitudinal edges 35*a* of the penetration slot 35 of the cable holder 8. As a result, the cable holder 8 can now no longer be displaced parallel to the tube longitudinal axis 2*c* relative to the supporting frame 18, and also can no longer be rotated about the tube longitudinal axis 2*c* relative to the supporting frame 18.

The cable holder 8 is thus fixed in a form-fitting manner in the supporting frame 18 and via this in the traverse tube 2.

The remote actuation button 4 is partially introduced together with the supporting frame 18 through the longitudinal slot 12 and the penetration slot 35 of the cable holder 8 into the traverse tube 2. The remote actuation button 4 thus penetrates through the penetration slot 35 of the cable holder 8 and the supporting frame 18.

The cable pull mechanism 6 is already attached in a known manner to the supporting frame 18 and to the coupling lever 5 in the vicinity of the movable locking element 20 before the supporting frame 18 is inserted.

An advantage of the cable holder 8 according to the invention is that the cables 26 are permanently fixed in the traverse tube 2. They cannot move in particular such that the release mechanism of the release device 1 is blocked. Since the available space in the traverse tube 2 is limited, there is the risk that the cables 26, even if they move only slightly after installation, block the mechanism or the components of the release device 1. This is prevented by the cable holder 8 according to the invention. Here, in particular due to the small available installation space, it was not immediately obvious to provide an additional component inside the traverse tube 2.

It is also of course within the scope of the invention that one or more cables 26 are retained only on one side of the cable holder 8, i.e., only on one of the two wall longitudinal edges 32.

While the above description constitutes the preferred embodiment of the present invention, it will be appreciated that the invention is susceptible to modification, variation and change without departing from the proper scope and fair meaning of the accompanying claims.

The invention claimed is:

1. A remotely actuable release device for unlocking of a vehicle door lock the release device comprising:
- a) a traverse tube,
- b) a remote actuation button supported on the traverse tube and actuated by pressing the remote actuation button into the traverse tube, and
- c) a cable pull mechanism for coupling to the vehicle door lock, wherein the cable pull mechanism is in an operative connection with the remote actuation button and is disposed inside the traverse tube, and
- d) a cable holder disposed inside the traverse tube and including at least two power cables attached thereto, wherein the at least two power cables extend through the entirety of the traverse tube.

2. The release device according to claim 1, wherein the at least two power cables are releasably attached to the cable holder.

3. The release device according to claim 2, wherein the cable holder includes at least one attachment means by which at least one of the at least two power cables is connected to the cable holder.

4. The release device according to claim 3, wherein the at least one power cable of the at least two power cables is connected to the cable holder via a clamping and/or form-fitting connection.

5. The release device according to claim 1, wherein the cable holder abuts in a form-fitting manner against an inside of the traverse tube such that, due to the form-fitting manner, the cable holder is
- a) non-rotatable except for a rotatability of the cable holder about a tube longitudinal axis of the traverse tube relative to the traverse tube, and
- b) immovable relative to the traverse tube except for a displaceability of the cable holder relative to the traverse tube parallel to the tube longitudinal axis.

6. The release device according to claim 1, wherein the cable holder abuts in a form-fitting manner against an inside of the traverse tube such that, due to the form-fitting manner, the cable holder is non-rotatable and immovable with respect to a tube longitudinal axis, except for a rotatability about the tube longitudinal axis of the traverse tube relative to the traverse tube and a displaceability of the cable holder relative to the traverse tube parallel to the tube longitudinal axis.

7. The release device according to claim 1, wherein the cable holder forms a channel and includes a channel wall having a channel wall outer surface and a channel wall inner surface as well as two wall longitudinal edges.

8. The release device according to claim 7, wherein the cable holder further forms a first, lock-side holder end and a second holder end, wherein the cable holder is open at the two first and second holder ends.

9. The release device according to claim 7, wherein the cable holder has a semicircular or a U-shaped cross-section.

10. The release device according to claim 9, wherein a diameter of the channel wall outer surface corresponds to an inner diameter of a tube wall of the traverse tube.

11. The release device according to claim 7, wherein the cable holder includes at least one attachment means arranged in a region of one of the wall longitudinal edges, by means of which respectively at least one of the at least two power cables is attached to the cable holder.

12. The release device according to claim 11, further comprising a cable bundle including the at least two power cables, wherein the cable bundle includes two bundled sections and a split section disposed therebetween, wherein, in the two bundled sections, the at least two power cables are bundled to one another and form a single cable harness, and in the split section, the cable bundle is divided into two cable harnesses, each of which is comprised of at least one of the at least two power cables, wherein the cable bundle is attached to the cable holder in a region of the split section, and the cable harnesses are each attached to the cable holder in the region of one of the two wall longitudinal edges.

13. The release device according to claim 11, wherein the cable holder includes at least two cable receiving grooves in each of which at least one of the power cables is disposed, wherein one of the at least two cable receiving grooves respectively extends from one of the two wall longitudinal edges into the channel wall.

14. The release device according to claim 13, wherein the cable holder further includes a plurality of clips disposed in the regions of the wall longitudinal edges, for respectively attaching at least one of the at least two power cables.

15. The release device according to claim 14, wherein at least one of the at least two power cables is respectively disposed in one of the cable receiving grooves, and another at least one of the at least two power cables is disposed over the at least one of the at least two power cables that is respectively disposed in one of the cable receiving grooves and is held by a respective one of the plurality of clips.

16. The release device according to claim 15, wherein the other at least one of the at least two power cables held by the respective one of the plurality clips covers the at least one of the at least two power cables disposed in the one of the cable receiving grooves such that the at least one of the at least two power cables disposed in the one of the cable receiving grooves is retained in the one of the cable receiving grooves.

17. The release device according to claim 13, wherein the at least one cable receiving groove extends over the entire wall longitudinal edge.

18. The release device according to claim 11, wherein the at least one of the at least two power cables is releasably attached to the cable holder.

19. The release device according to claim 11, wherein the at least one of the at least two power cables is attached to the cable holder in a clamping and/or form-fitting manner.

20. The release device according to claim 7, wherein the cable holder includes a plurality of clips disposed in a region of the wall longitudinal edges, for respectively attaching at least one of the at least two power cables, wherein each of the plurality of clips includes two clip halves, between which at least one of the at least two power cables is respectively retained, and the two clip halves each include an outer clip half and an inner clip half, wherein each of the inner clip halves protrudes over an inner edge section of a respective one of the wall longitudinal edges and abuts inside on a tube wall of the traverse tube or is slightly spaced therefrom.

21. The release device according to claim 20, wherein the cable holder further includes two cable receiving grooves, in each of which at least one of the at least two power cables is disposed, wherein each of the two cable receiving grooves respectively extends from one of the two wall longitudinal edges into the channel wall, and wherein the two cable receiving grooves each extend over the entirety of the respective wall longitudinal edge, and the at least two power cables are respectively enclosed in a space formed by the inner clip halves, the outer clip halves, the respective cable receiving groove and the tube wall of the traverse tube.

22. The release device according to claim 1, wherein the cable holder is composed of plastic.

23. The release device according to claim 1, further comprising a cable bundle including the at least two power cables, wherein the cable bundle includes two bundled sections and a split section disposed therebetween, wherein in the two bundled sections, the at least two power cables are bundled with one another and form a single cable harness, and in the split section, the at least two power cables are divided into two cable harnesses, each of which is comprised of at least one of the at least two power cables, wherein the cable bundle is attached to the cable holder in a region of the split section.

24. The release device according to claim 23, wherein each of the two cable harnesses is comprised of the plurality of power cables.

25. The release device according to claim 1, wherein the cable holder includes a plurality of clips disposed in a region of wall longitudinal edges of the cable holder for respectively attaching at least one of the at least two power cables.

26. The release device according to claim 25, wherein the clips respectively attach the at least one of the at least two power cables in a clamping and/or form-fitting manner.

27. The release device according to claim 25, wherein each of the clips includes two clip halves, between which the at least one of the at least two power cables is respectively retained.

28. The release device according to claim 27, wherein the clip halves are each resiliently connected to a channel wall of the cable holder in the region of the wall longitudinal edges.

29. The release device according to claim 25, wherein the two clip halves each include a clip surface facing the other clip half which serve for clampingly and/or form-fittingly retaining at least one of the at least two power cables, wherein at least one of the two clip surfaces includes a channel shaped recess extending parallel to a channel longitudinal direction, and wherein at least one of the at least two power cables, is disposed inside the recess.

30. The release device according to claim 1, wherein the cable holder is fixed in a form-fitting manner in a supporting frame attached to the traverse tube, and is fixed via the supporting frame in the traverse tube such that it is non-rotatable about a tube longitudinal axis of the traverse tube relative to the traverse tube, and/or is immovable with respect to the traverse tube parallel to the tube longitudinal axis relative to the transverse tube.

31. The release device according to claim 30, wherein the cable holder includes a penetration slot which is penetrated through by the supporting frame such that the cable holder is non-rotatable about the tube longitudinal axis relative to the supporting frame and/or is immovable relative to the supporting frame parallel to the tube longitudinal axis.

32. The release device according to claim 31, wherein the supporting frame abuts against slot end edges and slot longitudinal edges of the penetration slot of the cable holder.

33. The release device according to claim 30, wherein the supporting frame is non-rotatably and immovably connected to the traverse tube.

34. The release device according to claim 30, wherein the remote actuation button is pivotably supported on the supporting frame.

35. The release device according to claim 30, wherein the supporting frame includes a circumferential frame edge and two frame side walls spaced from each other, which have a longitudinal extension parallel to the tube longitudinal axis and are spaced from each other perpendicular relative to the tube longitudinal axis.

36. The release device according to claim 1, wherein the remote actuation button penetrates through a longitudinal slot of the traverse tube.

37. The release device according to claim 1, wherein the cable pull mechanism is actuable by actuating the remote actuation button.

38. The release device according to claim 1, wherein the traverse tube includes two tube ends, and the remote actuation button is disposed between the two tube ends and spaced therefrom.

39. The release device according to claim 1, wherein the release device is a release device for unlocking of the vehicle door lock of a construction machine or of an agricultural vehicle.

40. A combined assembly of a vehicle door lock for locking and latching of a door of a vehicle, the combined assembly including a release mechanism by which the lock may be unlocked, wherein the release mechanism includes the remotely actuable release of claim 1.

41. The combined assembly according to claim 40, wherein the vehicle door lock includes:

a) a lock case, b) at least one rotary latch, rotatably supported in the lock case, for clasping and retaining a locking bolt in a pre-locking position or a final locking position, c) at least one locking pawl, disposed in the lock case, for locking the at least one rotary latch in its pre-locking position or final locking position, wherein the at least one locking pawl is in operative connection with the remotely actuable release device such that the locking of the at least one rotary latch is releasable.

42. The combined assembly according to claim 40, wherein the release mechanism includes a locally actuable release device and the remotely actuable release device, wherein the locking of the vehicle door lock is releasable both with the locally actuable release device and with the remotely actuable release device.

43. The combined assembly according to claim 40, wherein the cable pull mechanism is connected one end to the remote actuation button, and is connected on another end to the vehicle door lock.

44. The combined assembly according to claim 43, wherein a pull cable or a pull rod of the cable pull mechanism is connected to one end to the remote actuation button and is connected on another end to the vehicle door lock.

45. The combined assembly according to claim 43, wherein the cable pull mechanism is connected to the remote actuation button via a coupling lever.

* * * * *